United States Patent
Lin

(10) Patent No.: US 9,549,133 B2
(45) Date of Patent: Jan. 17, 2017

(54) IMAGE CAPTURE DEVICE, AND DEFECTIVE PIXEL DETECTION AND CORRECTION METHOD FOR IMAGE SENSOR ARRAY

(71) Applicant: Silicon Optronics, Inc., Hsinchu (TW)

(72) Inventor: Chun-Hung Lin, Hsinchu (TW)

(73) Assignee: SILICON OPTRONICS, INC., Hsinchu (TW)

( * ) Notice: Subject to any disclaimer, the term of this patent is extended or adjusted under 35 U.S.C. 154(b) by 0 days.

(21) Appl. No.: 14/703,224

(22) Filed: May 4, 2015

(65) Prior Publication Data
US 2016/0127667 A1    May 5, 2016

(30) Foreign Application Priority Data
Oct. 31, 2014   (TW) .............. 103137754 A

(51) Int. Cl.
*H04N 9/64* (2006.01)
*H04N 5/367* (2011.01)

(52) U.S. Cl.
CPC .................. *H04N 5/3675* (2013.01)

(58) Field of Classification Search
CPC .... H04N 5/2171; H04N 5/2176; H04N 5/367; H04N 5/3675; H04N 1/4097; H04N 5/2178
(Continued)

(56) References Cited

U.S. PATENT DOCUMENTS

| 6,529,238 B1* | 3/2003 | Mahant-Shetti ....... H04N 5/367 348/246 |
| 6,937,361 B1* | 8/2005 | Kondo ................ H04N 1/4097 358/1.9 |

(Continued)

FOREIGN PATENT DOCUMENTS

CN        1960439 A        5/2007

OTHER PUBLICATIONS

Office Action dated Nov. 17, 2015 of corresponding Taiwan patent application No. 103137754 (5 pgs.).

*Primary Examiner* — Chia-Wei A Chen
(74) *Attorney, Agent, or Firm* — Muncy, Geissler, Olds & Lowe, P.C.

(57) ABSTRACT

An image capture device with a reduced number of line buffers. Based on an $n_{th}$ line of image data provided from an image sensor array and buffered data in the line buffers, a logic circuit determines defective candidates in an $n_{th}$ line of image data. When the $(n+p)_{th}$ line of image data is provided from the image sensor array, the logic circuit reexamines the defective candidates in the $n_{th}$ line of image data, for defective-pixel compensation, based on the $(n+p)_{th}$ line of image data and the buffered data in the plurality of line buffers. The buffered data in the line buffers contains the $(n-p)_{th}$ to $(n-1)_{th}$ lines of image data while the $n_{th}$ line of image data is provided from the image sensor array, and contains the $n_{th}$ to $(n+p-1)_{th}$ lines of image data while the $(n+p)_{th}$ line of image data is provided from the image sensor array.

17 Claims, 9 Drawing Sheets

(58) Field of Classification Search
USPC .................................................. 348/246, 247
See application file for complete search history.

(56) References Cited

U.S. PATENT DOCUMENTS

| | | | |
|---|---|---|---|
| 8,712,183 B2* | 4/2014 | Cabral | H04N 5/3572 382/274 |
| 9,191,595 B2* | 11/2015 | Ikedo | H04N 5/367 |
| 9,379,156 B2* | 6/2016 | Cabral | H01L 27/14627 |
| 2002/0149683 A1 | 10/2002 | Post | |
| 2003/0001078 A1* | 1/2003 | Baharav | H04N 5/367 250/208.1 |
| 2003/0043286 A1* | 3/2003 | Kato | H04N 5/3675 348/246 |
| 2004/0051798 A1* | 3/2004 | Kakarala | H04N 5/367 348/246 |
| 2006/0087570 A1* | 4/2006 | Chou | H04N 1/401 348/246 |
| 2007/0285536 A1 | 12/2007 | Post | |
| 2008/0056606 A1* | 3/2008 | Kilgore | F41G 7/2213 382/275 |
| 2009/0174797 A1* | 7/2009 | Hu | H04N 5/3675 348/247 |
| 2010/0149386 A1* | 6/2010 | Wright | H04N 5/3675 348/246 |
| 2011/0193998 A1* | 8/2011 | Subbotin | H04N 5/3675 348/247 |
| 2011/0235940 A1 | 9/2011 | Pavkovich | |
| 2012/0081578 A1* | 4/2012 | Cote | H04N 9/045 348/231.99 |
| 2012/0212657 A1 | 8/2012 | Mo et al. | |
| 2014/0192249 A1* | 7/2014 | Kishi | H04N 5/23212 348/349 |
| 2014/0347536 A1* | 11/2014 | Senda | H04N 5/378 348/308 |

* cited by examiner

IMAGE CAPTURE DEVICE, AND DEFECTIVE PIXEL DETECTION AND CORRECTION METHOD FOR IMAGE SENSOR ARRAY

CROSS REFERENCE TO RELATED APPLICATIONS

This Application claims priority of Taiwan Patent Application No. 103137754, filed on Oct. 31, 2014, the entirety of which is incorporated by reference herein.

BACKGROUND OF THE INVENTION

Field of the Invention

The present invention relates to image capture devices and defective pixel detection and correction methods for image sensor array, particularly for reducing the number of line buffers.

Description of the Related Art

An image sensor array, e.g. an array of CMOS cells, may contain defective pixels like dark-spot defective pixels and bright-spot defective pixels.

The correct detection and proper compensation for defective pixels in an image sensor array is an important issue.

BRIEF SUMMARY OF THE INVENTION

Image capture devices with a reduced number of line buffers and detection and correction methods for defective pixels in an image sensor array are disclosed.

An image capture device in accordance with an exemplary embodiment of the disclosure includes a plurality of line buffers and a logic circuit. Based on the $n_{th}$ line of image data captured by an image sensor array as well as buffered data in the plurality of line buffers, the logic circuit determines defective candidates in the $n_{th}$ line of image data. When the $(n+p)_{th}$ line of image data is provided from the image sensor array, the logic circuit further reexamines the defective candidates in the $n_{th}$ line of image data, for defective-pixel compensation, based on the $(n+p)_{th}$ line of image data as well as the buffered data in the plurality of line buffers. n and p are numbers. The buffered data in the plurality of line buffers contains the $(n-p)_{th}$ to $(n-1)_{th}$ lines of image data while the $n_{th}$ line of image data is provided from the image sensor array. The buffered data in the plurality of line buffers contains the $n_{th}$ to $(n+p-1)_{th}$ lines of image data while the $(n+p)_{th}$ line of image data is provided from the image sensor array.

In comparison with conventional techniques, the number of line buffers is reduced by more than half in accordance with the aforementioned two-stage defect evaluation. In an exemplary embodiment of the disclosure, the image sensor array and the reduced line buffers and the logic circuit are packaged in a single package.

A defective pixel detection and correction method for an image sensor array in accordance with an exemplary embodiment of the disclosure comprises the following steps: based on an $n_{th}$ line of image data provided from the image sensor array as well as buffered data in a plurality of line buffers, determining defective candidates in the $n_{th}$ line of image data; and, when the $(n+p)_{th}$ line of image data is provided from the image sensor array, reexamining the defective candidates in the $n_{th}$ line of image data, for defective-pixel compensation, based on the $(n+p)_{th}$ line of image data as well as the buffered data in the plurality of line buffers. n and p are numbers. The buffered data in the plurality of line buffers contains the $(n-p)_{th}$ to $(n-1)_{th}$ lines of image data while the $n_{th}$ line of image data is provided from the image sensor array. The buffered data in the plurality of line buffers contains the $n_{th}$ to $(n+p-1)_{th}$ lines of image data while the $(n+p)_{th}$ line of image data is provided from the image sensor array.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments carrying out the invention. This description is made for the purpose of illustrating the general principles of the invention and should not be taken in a limiting sense. The scope of the invention is best determined by reference to the appended claims.

Figure 1:
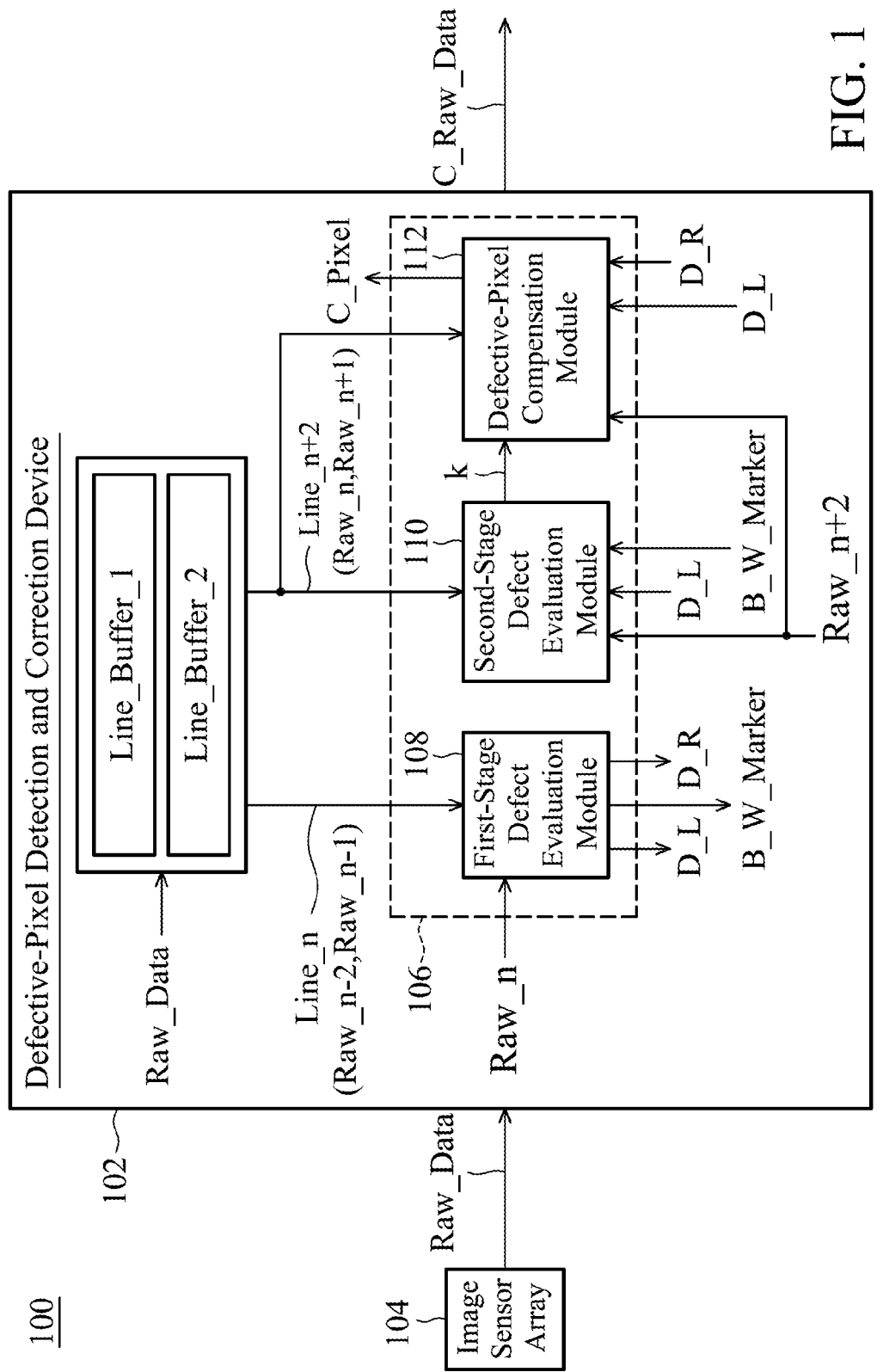
FIG. 1 illustrates an image capture device 100 in accordance with an exemplary embodiment of the disclosure, which includes a defective pixel detection and correction device 102 detecting and correcting defective pixels in two stages.

FIG. 1 illustrates an image capture device 100 in accordance with an exemplary embodiment of the disclosure, which includes a defective pixel detection and correction device 102 detecting and correcting defective pixels in two stages. The defective pixel detection and correction device 102 is coupled to an image sensor array 104 (e.g. an array of CMOS cells or the like) and thereby to receive image data Raw_Data from the image sensor array 104. The defective pixel detection and correction device 102 includes line buffers Line_Buffer_1 and Line_Buffer_2 and a logic circuit 106. The logic circuit 106 includes a first-stage defect evaluation module 108, a second-stage defect evaluation module 110 and a defective-pixel compensation module 112.

The first-stage defect evaluation module 108 is operated when an $n_{th}$ line of image data Raw_n is provide from the image sensor array 104 and at the same time the $(n-2)_{th}$ line of image data Raw_n−2 and the $(n-1)_{th}$ line of image data Raw_n−1 are buffered in the line buffers Line_Buffer_1 and Line_Buffer_2 as buffered data Lines_n. Based on the $n_{th}$ line of image data Raw_n as well as the buffered data Lines_n (including image data Raw_n−2 and Raw_n−1) in the line buffers Line_Buffer_1 and Line_Buffer_2, the first-stage defect evaluation module 108 determines defective candidates in the $n_{th}$ line of image data Raw_n. The pixel locations, dark/bright spot marks and reference pixel information about the defective candidates in the $n_{th}$ line of image data Raw_n are recorded into vectors D_L, B_W_Marker and D_R, respectively. The reference pixel information is recorded for the calculations performed for defective-pixel compensation.

The second-stage defect evaluation module 110 is operated when the $(n+2)_{th}$ line of image data Raw_n+2 is provided from the image sensor array 104 and the $n_{th}$ line of image data Raw_n and the $(n+1)_{th}$ line of image data Raw_n+1 are buffered in the line buffers Line_Buffer_1 and Line_Buffer_2 as buffered data Lines_n+2. The second-stage defect evaluation module 110 looks up the vectors D_L and B_W_Marker for the pixel locations and the dark/bright spot marks of the defective candidates in the $n_{th}$ line of image data Raw_n, and reexamines whether the defective candidates in the $n_{th}$ line of image data Raw_n are really from defective pixels. The reexamination performed by the second-stage defect evaluation module 110 is based on the $(n+2)_{th}$ line of image data Raw_n+2 as well as the buffered data Lines_n+2 (including image data Raw_n and Raw_n+1) in the line buffers Line_Buffer_1 and Line_Buffer_2 and is further assisted by the dark/bright spot marks recorded in the vector B_W_Marker. A defective candidate classified as likely be a bright spot in the first-stage defect evaluation (performed by module 108) and then classified as a bright spot again in the second-stage defect evaluation (performed by module 110) is confirmed from a bright-spot defective pixel. A defective candidate classified as likely be a dark spot in the first-stage defect evaluation (performed by module 108) and then classified as a dark spot again in the second-stage defect evaluation (performed by module 110) is confirmed from a dark-spot defective pixel. After the second-stage defect evaluation (performed by module 110), the defective-pixel compensation module 112 performs defective-pixel compensation on the confirmed defective pixels.

As shown, when the second-stage defect evaluation module 110 determines that an image sensor cell indicated by in the vector D_L at index k is really a defective pixel, the defective-pixel compensation module 112 obtains the pixel location of the image sensor cell from vector D_L at index k, and obtains reference pixel information from vector D_R at index k. The defective-pixel compensation module 112 performs defective-pixel compensation on the $n_{th}$ line of image data Raw_n based on the reference pixel information obtained from vector D_R and the buffered data Lines_n+2 (including image data Raw_n and Raw_n+2) in the line buffers Line_Buffer_1 and Line_Buffer_2 and the $(n+2)_{th}$ line of image data Raw_n+2. The pixel value detected by each defective pixel is replaced by a compensated pixel value C_Pixel corresponding thereto. The defective pixel detection and correction device 102 outputs the compensated image data C_Raw_Data to the back-end circuits like a noise filter, an image compression module and so on.

Figure 2A:
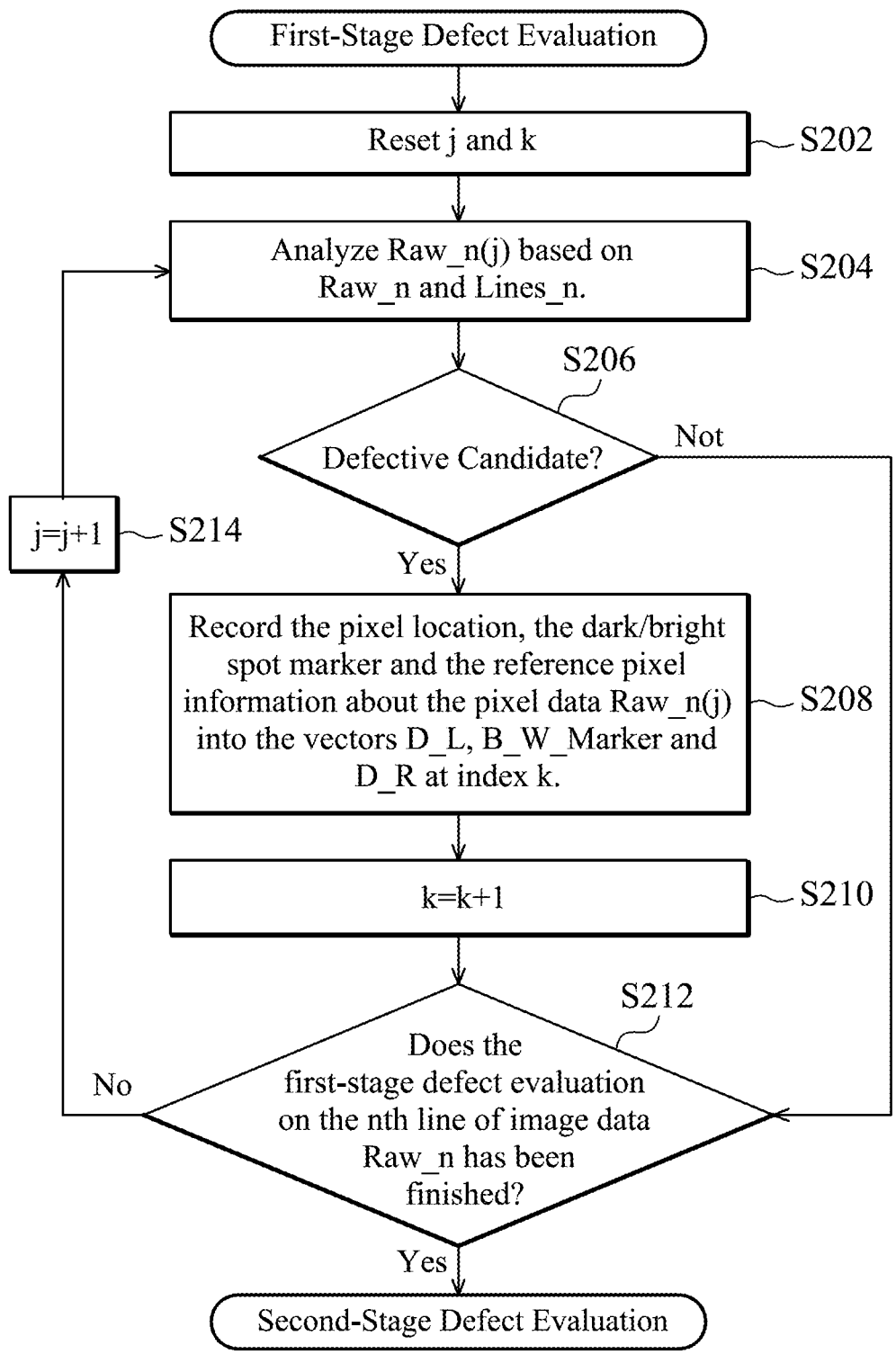
FIG. 2A is a flowchart depicting how a first-stage defect evaluation module 108 works in accordance with an exemplary embodiment of the disclosure.

FIG. 2A is a flowchart depicting how the first-stage defect evaluation module 108 operates in accordance with an exemplary embodiment of the disclosure. The image data in the $n_{th}$ line, Raw_n, is analyzed pixel by pixel with a variable j as a pixel index to search for the defective candidates. The pixel locations, dark/bright spot marks and reference pixel information about the defective candidates are indexed as vectors D_L, B_W_Marker and D_R along index k. In step S202, the index variables j and k are reset, e.g., j=k=0. In step S204, the pixel data Raw_n(j) at index j in the $n_{th}$ line of image data Raw_n is analyzed based on the $n_{th}$ line of image data Raw_n as well as the buffered data Lines_n (including image data Raw_n−2 and Raw_n−1) in line buffers Line_Buffer_1 and Line_Buffer_2. When it is determined in step S206 that the pixel data Raw_n(j) is a defective candidate, step S208 is performed to record the pixel location, the dark/bright spot mark and the reference pixel information about the defective candidate into the vectors D_L, B_W_Marker and D_R at index k. In step S210, the index variable k is incremented by 1. Step S212 is performed to check whether the first-stage defect evaluation on the $n_{th}$ line of image data Raw_n is completely finished. Step S212 is also performed when it is determined in step S206 that the pixel data Raw_n(j) is not a defective candidate and, at this case, steps S208 and S210 are bypassed. When it is determined in step S212 that the $n_{th}$ line of image data Raw_n has not been completely evaluated by the first-stage defect evaluation, step S214 is performed and the index value j is incremented by 1 and step S204 is repeated. When it is determined in step S212 that the $n_{th}$ line of image data Raw_n has been completely evaluated by the first-stage defect evaluation, the procedure is switched to the second-stage defect evaluation.

Figure 2B:
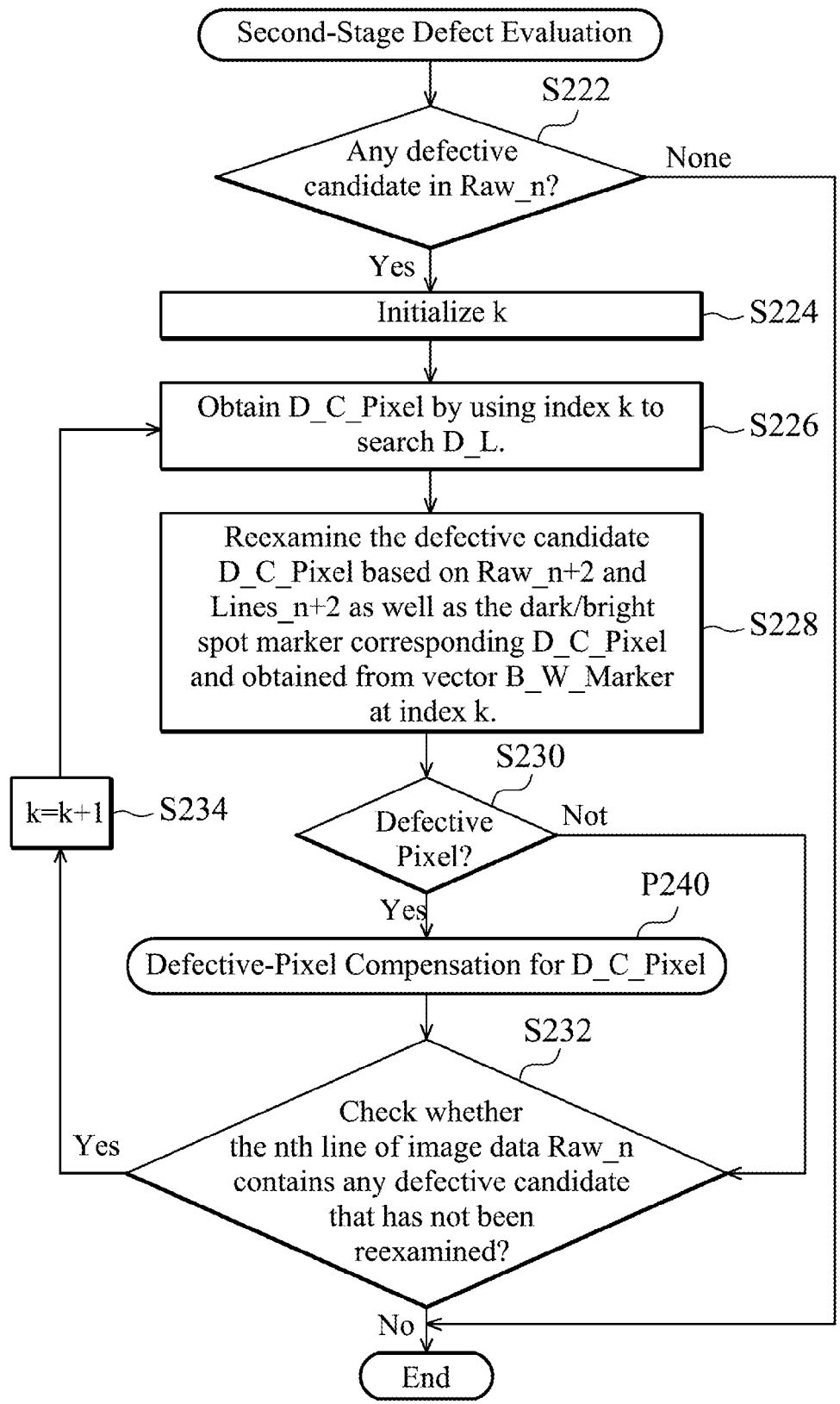
FIG. 2B is a flowchart depicting how a second-stage defect evaluation module 110 works in accordance with an exemplary embodiment of the disclosure.

FIG. 2B is a flowchart depicting how the second-stage defect evaluation module 110 operates in accordance with an exemplary embodiment of the disclosure. It is checked in step S222 whether the $n_{th}$ line of image data Raw_n contains any defective candidate. When the $n_{th}$ line of image data Raw_n contains defective candidate(s), step S224 is performed to initialize the index variable k, e.g., k=0. In step S226, pixel location of a defective candidate D_C_Pixel is obtained from vector D_L at index k. In step S228, the pixel candidate D_C_Pixel is reexamined based on the $(n+2)_{th}$ line of image data Raw_n+2 as well as the buffered data Lines_n+2 (including image data Raw_n and Raw_n+1) in the line buffers Line_Buffer_1 and Line_Buffer_2. The dark/bright spot mark of the pixel candidate D_C_Pixel is obtained from vector B_W_Marker at index k to improve the reexamination procedure. When it is determined in step S230 that the defective candidate D_C_Pixel is not true, step S232 is performed to check whether the $n_{th}$ line of image data Raw_n contains other defective candidate(s) that has/have not been reexamined. When the $n_{th}$ line of image data Raw_n contains any defective candidate waiting to be reexamined, step S234 is performed to add 1 to the index variable k and step S226 is repeated. When all defective candidates in the $n_{th}$ line of image data Raw_n have been reexamined, the second-stage defect evaluation finishes.

Figure 2C:
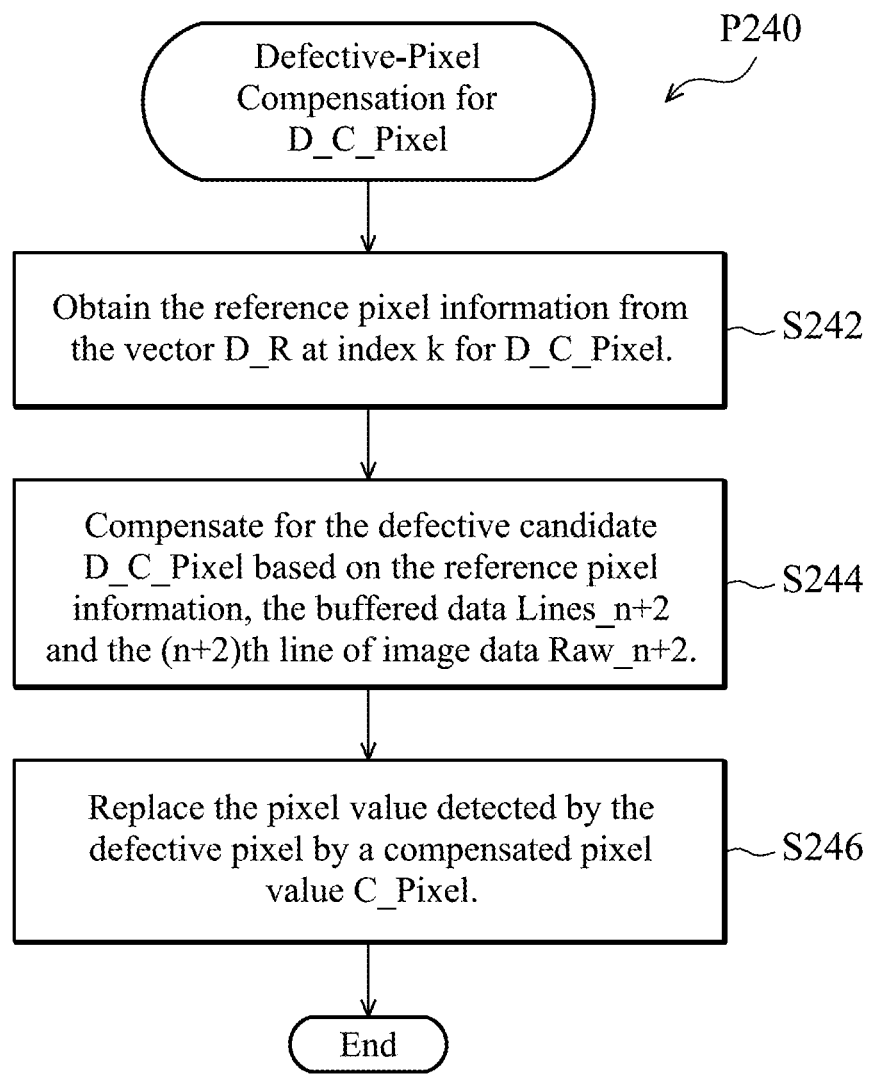
FIG. 2C is a flowchart depicting a defective-pixel compensation procedure P240 for a defective candidate D_C_Pixel (corresponding to the defective-pixel compensation module 112)

As shown, when it is determined in step S230 that the defective candidate D_C_Pixel is true, procedure P240 is performed for defective-pixel compensation for the defective candidate D_C_Pixel. FIG. 2C is a flowchart depicting a defective-pixel compensation procedure P240 for a defective candidate D_C_Pixel. In step S242, the reference pixel information about the defective candidate D_C_Pixel is obtained from vector DR at index k. The index number, k, is also used in looking up m vector D_L to know where the defective candidate D_C_Pixel locates in the $n_{th}$ line of image data Raw_n. In step S244, the defective candidate D_C_Pixel is compensated for based on the reference pixel information, the buffered data Lines_n+2 (Raw_n and Raw_n+1 buffered in the line buffers Line_Buffer_1 and Line_Buffer_2) and the $(n+2)_{th}$ line of image data Raw_n+2. In step S246, the pixel value detected by the defective pixel is replaced by a compensated pixel value C_Pixel and then the procedure P240 ends.

Figure 3A:
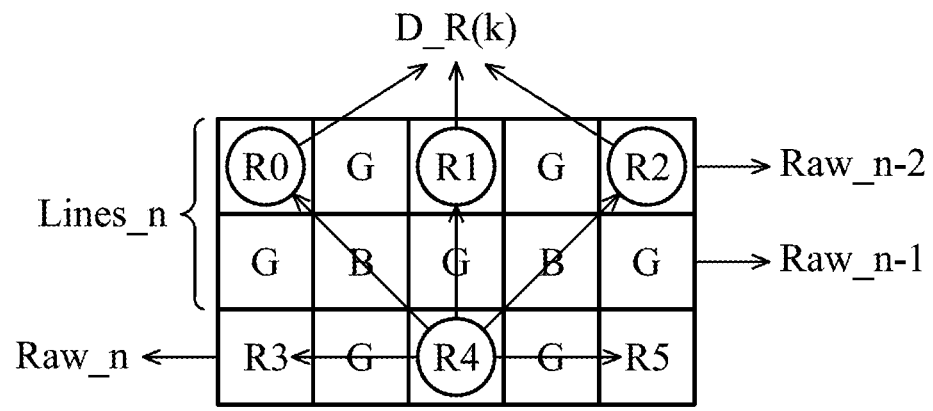
FIGS. 3A, 3B and 3C are provided to describe the operational concepts of the first-stage defect evaluation module 108, the second-stage defect evaluation modulation 110 and the defective-pixel compensation module 112.
Figure 3B:
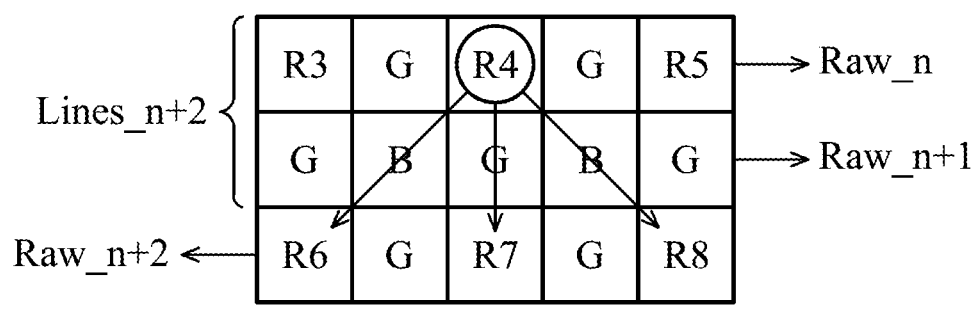
Figure 3C:
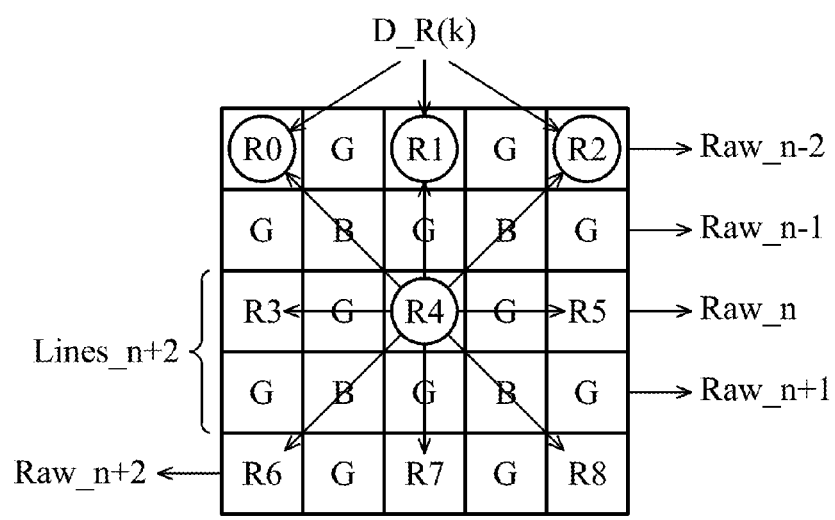

FIGS. 3A, 3B and 3C are provided to describe the operational concepts of the first-stage defect evaluation module 108, the second-stage defect evaluation modulation 110 and the defective-pixel compensation module 112.

FIG. 3A is provided to describe the operational concept of the first-stage defect evaluation module 108. The $n_{th}$ line of image data Raw_n with red pixel data R3, R4 and R5 is provided from the image sensor array 104 while buffered data Lines_n in the line buffers Line_Buffer_1 and Line_Buffer_2 contains red pixel data R0, R1 and R2 in the $(n-2)_{th}$ line of image data Raw_n-2. In this exemplary embodiment, when determining whether the red pixel data R4 in the $n_{th}$ line of image data Raw_n is a defective candidate, the red pixel data R4 is compared to the red pixel data R3 and R5 in the $n_{th}$ line of image data Raw_n and the red pixel data R0, R1 and R2 in the buffered data Lines_n. When the red pixel data R4 is at a much higher level than the red pixel data R0, R1, R2, R3 and R5 (e.g., greater than the red pixel data R0, R1, R2, R3 and R5 by at least a threshold difference), it is determined that the red pixel data R4 may be detected from a bright-spot defective pixel. When the red pixel data R4 is at a much lower level than the red pixel data R0, R1, R2, R3 and R5 (e.g., lower than the red pixel data R0, R1, R2, R3 and R5 by at least a threshold difference), it is determined that the red pixel data R4 may be a dark-spot defective pixel. The result of the first-stage defect evaluation about the red pixel data R4 may be recorded into a vector B_W_Marker at index k as a dark/bright spot mark. The red pixel data R0, R1 and R2 is further recorded into a vector D_R at index k as the reference pixel information about the red pixel data R4.

FIG. 3B is provided to describe the operational concept of the second-stage defect evaluation module 110. The $(n+2)_{th}$ line of image data Raw_n+2 with red pixel data R6, R7 and R8 is provided from the image sensor array 104 while buffered data Lines_n+2 in the line buffers Line_Buffer_1 and Line_Buffer_2 contains the red pixel data R4 in the $n_{th}$ line of image data Raw_n. When it is determined in the first-stage defect evaluation (referring to FIG. 3A) that the red pixel data R4 is a defective candidate, the red pixel data R4 contained in the buffered data Line_n+2 is compared to the red pixel data R6, R7 and R8 in the $(n+2)_d$ line of image data Raw_n+2 as that depicted in FIG. 3B to reexamine whether the red pixel data R4 is detected from a defective pixel. For example, the dark/bright spot mark obtained from the vector B_W_Marker at index k may be taken into consideration to determine whether the red pixel data R4 is from a dark/bright-spot defective pixel. When the dark/bright spot mark of the red pixel data R4 shows that the red pixel data R4 may be a bright spot and the red pixel data R4 is at a much higher level (e.g. by at least a threshold difference) than the red pixel data R6, R7 and R8, it is confirmed in the second-stage defect evaluation that the red pixel data R4 is detected from a bright-spot defective pixel. When the dark/bright spot mark of the red pixel data R4 shows that the red pixel data R4 may be a dark spot and the red pixel data R4 is at a much lower level (e.g. by at least a threshold difference) than the red pixel data R6, R7 and R8, it is confirmed in the second-stage defect evaluation that the red pixel data R4 is detected from a dark-spot defective pixel. The defective pixel data R4 is compensated for in accordance with FIG. 3C.

FIG. 3C is provided to describe the operational concept of the defective-pixel compensation module 112. The $(n+2)_{th}$ line of image data Raw_n+2 with red pixel data R6, R7 and R8 is provided from the image sensor array 104 while buffered data Lines_n+2 in the line buffers Line_Buffer_1 and Line_Buffer_2 contains the red pixel data R3, R4 and R5 in the $n_{th}$ line of image data Raw_n. When the red pixel data R4 is confirmed from a defective pixel in the second-stage defect evaluation shown in FIG. 3B, the reference pixel information R0, R1 and R2 about the red pixel data R4 is retrieved from the vector D_R at index k and is used in the compensation for the red pixel data R4 with the red pixel data R6, R7 and R8 in the $(n+2)_{th}$ line of image data Raw_n+2 and the red pixel data R3 and R5 contained in the buffered data Lines_n+2 and thereby a compensated pixel value C_Pixel to replace the original red pixel data R4 is obtained.

According to the disclosure, the number of line buffers is reduced to at least half that required in conventional techniques. As for the compensation for the red pixel data R4 (referring to FIGS. 3A to 3C), four line buffers are required in conventional techniques to gather the 5×5 Bayer pattern for the red pixel data R4. However, just two line buffers are required in this disclosure to achieve the same quality of compensation.

In another exemplary embodiment, no reference pixel information is stored and there is no need to maintain the vector D_R. The red pixel data R4 is compensated for based on the red pixel data R6, R7 and R8 in the $(n+2)_{th}$ line of image data and the red pixel data R3 and R5 contained in the buffered data Lines_n+2. For example, a median of the red pixel data R3, R5, R6, R7 and R8 may be regarded as the compensated pixel data C_Pixel to replace the red pixel data R4. In another exemplary embodiment, depending on whether the red pixel data R4 is a bright spot or a dark spot, the maximum one or minimum one between the red pixel data R3, R5, R6, R7 and R8 is selected as the compensated pixel data C_Pixel to replace the red pixel data R4. In another exemplary embodiment, a proper one between the pixel values R7, (R3+R5)/2, (R5+R6)/2 and (R3+R8)/2 is regarded as the compensated pixel data C_Pixel to replace the red pixel data R4.

In some exemplary embodiments, the vectors D_L, B_W_Marker and D_R recording the pixel locations, dark/bright spot marks and the reference pixel information about the defective candidates are stored in logic cells, like D-flip-flops and registers and so on, external to the line buffers Line_Buffer_1 and Line_Buffer_2. In comparison with the line buffers Line_Buffer_1 and Line_Buffer_2 implemented by large-sized devices like an SRAM, the circuit integration of the logic cells, e.g. D-flip-flops or registers, is much easier. Thus, the defective pixel detection and correction device 102 and the image sensor array 104 may be packaged in a single package.

Figure 4:
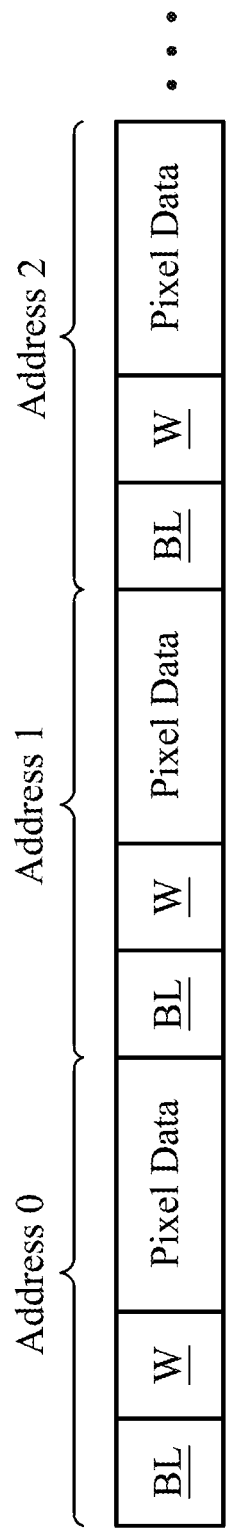
FIG. 4 illustrates a storage format on the line buffers in accordance with an exemplary embodiment of the disclosure.

In another exemplary embodiment, the line buffers Line_Buffer$_{13}$ 1 and Line_Buffer_2 are expanded to further store the dark/bright spot mark of each pixel. FIG. 4 illustrates a storage format on the line buffers in accordance with an exemplary embodiment of the disclosure. The addresses 0, 1 and 2 correspond to different pixels. In addition to pixel data, two bits BL and W are stored at each address to represent whether the pixel data recorded at the address is a possible dark spot or a possible bright spot. According to this format shown in FIG. 4, defective pixel locations (corresponding to the aforementioned vector D_L) and the corresponding dark/bright spot marks (corresponding to the aforementioned vector B_W_Marker) can be obtained from the line buffers.

Figure 5A:
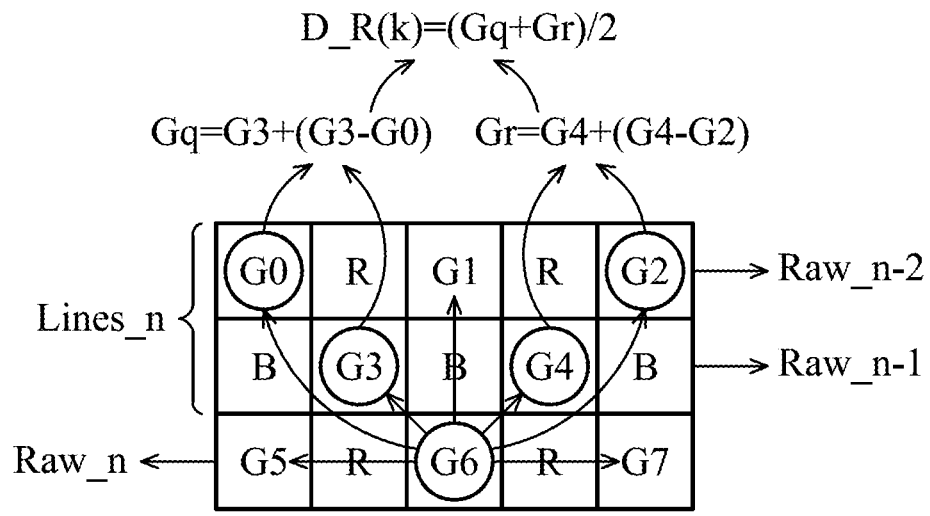
FIG. 5A, FIG. 5B and FIG. 5C are provided to describe the operational concepts of the first-stage evaluation module 108, the second-stage evaluation module 110 and the defective-pixel compensation module 112, which focus on the defective pixel detection and correction of green pixels.
Figure 5B:
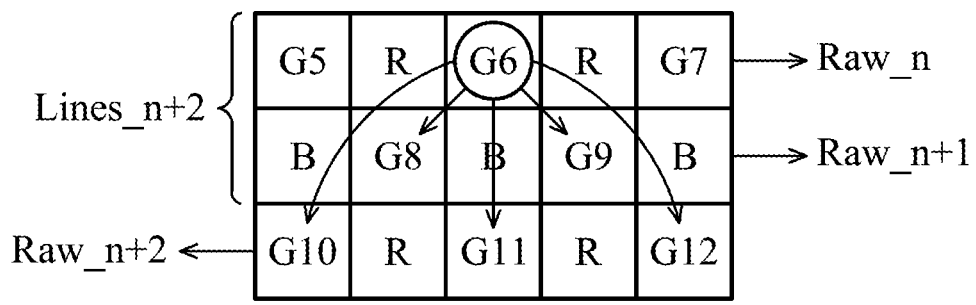
Figure 5C:
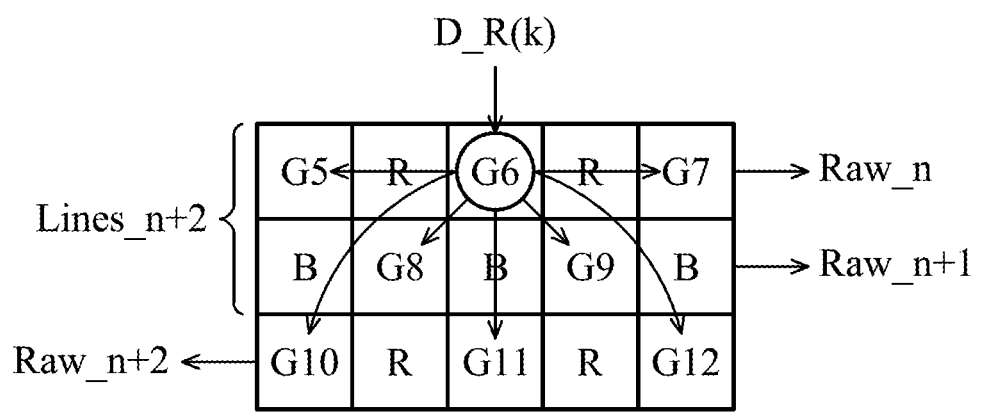

In another exemplary embodiment, it focuses on detecting and correcting defective green pixels. FIG. 5A, FIG. 5B and FIG. 5C are provided to describe the operational concepts of the first-stage evaluation module 108, the second-stage evaluation module 110 and the defective-pixel compensation module 112, which focus on the defective pixel detection and correction of green pixels.

FIG. 5A is provided to described the operational concept of the first-stage defect evaluation module 108. The $n_{th}$ line of image data Raw_n including the green pixel data G5, G6 and G7 is provided from the image sensor array 104 while buffered data Lines_n in the line buffers Line_Buffer_1 and Line_Buffer_2 contains green pixel data G0, G1 and G2 in the $(n-2)_{th}$ line of image data Raw_n-2 and green pixel data G3 and G4 in the $(n-1)_{th}$ line of image data Raw_n-1. When determining whether the green pixel data G6 in the $n_{th}$ line of image data Raw_n is a defective candidate, a comparison is performed on the green pixel data G0, G1, G2, G3 and G4 obtained from the buffered data Lines_n and the green pixel data G5, G6 and G7 in the $n_{th}$ line of image data Raw_n. When the green pixel data G6 is at a much higher level (e.g. by at least a threshold difference) than the green pixel data G0, G1, G2, G3, G5 and G7, the pixel providing the green pixel data G6 may be a bright-spot defective pixel. When the green pixel data G6 is at a much lower level (e.g. by at least a threshold difference) than the green pixel data G0, G1, G2, G3, G5 and G7, the pixel providing the green pixel data G6 may be a dark-spot defective pixel. The result of the first-stage defect evaluation about the green pixel data G6 may be recorded into a vector B_W_Marker at index k as a dark/bright spot mark. A value Gq (=G3+(G3-G0)) is calculated from the green pixel data G0 and G3 and a value Gr (=G4+(G4-G2)) is calculated from the green pixel data G2 and G4 by extrapolation, and ((Gq+Gr)/2), the average of the two values Gq and Gr is calculated and recorded into a vector D_R at index k as the reference pixel information about the green pixel data G6.

FIG. 5B is provided to describe the operational concept of the second-stage defect evaluation module 110. The $(n+2)_{th}$ line of image data Raw_n+2 including the green pixel data G10, G11 and G12 is provided from the image sensor array 104 while buffered data Lines_n+2 in the line buffers Line_Buffer_1 and Line_Buffer_2 contains green pixel data G5, G6 and G7 in the $n_{th}$ line of image data Raw_n and green pixel data G8 and G9 in the $(n+1)_{th}$ line of image data Raw_n+1. When the first-stage defect evaluation (referring to FIG. 5A) shows that the green pixel data G6 is a defective candidate, as shown in FIG. 5B, a comparison is performed on the green pixel data G6, G8 and G9 obtained from the buffered data Lines_n+2 and the green pixel data G10, G11 and G12 in the $(n+2)_{th}$ line of image data Raw_n+2 to reexamine whether the pixel providing the green pixel data G6 is a defective pixel. For example, the dark/bright spot mark obtained from the vector B_W_Marker at index k may be taken into consideration when reexamining whether the pixel providing the green pixel data G6 is a dark-spot defective pixel or a bright-spot defective pixel. When the dark/bright spot mark corresponding to the green pixel data G6 shows that the pixel detecting the green pixel data G6 may be a bright-spot defective pixel and green pixel data G6 is at a much higher level (e.g. by at least a threshold difference) than the green pixel data G8, G9, G10, G11 and G12, it is confirmed in the second-stage defect evaluation that the green pixel data G6 is detected from a bright-spot defective pixel. When the dark/bright spot mark corresponding to the green pixel data G6 shows that the pixel detecting the green pixel data G6 may be a dark-spot defective pixel and green pixel data G6 is at a much lower level (e.g. by at least a threshold difference) than the green pixel data G8, G9, G10, G11 and G12, it is confirmed in the second-stage defect evaluation that the green pixel data G6 is detected from a dark-spot defective pixel. The green pixel data G6 that has been confirmed from a defective pixel may be compensated for in accordance with the operational concept shown in FIG. 5C.

FIG. 5C is provided to describe the operational concept of the defective-pixel compensation module 112. The $(n+2)_{th}$ line of image data Raw_n+2 including the green pixel data G10, G11 and G12 is provided from the image sensor array 104 while buffered data Lines_n+2 in the line buffers Line_Buffer_1 and Line_Buffer_2 contains green pixel data G5, G6 and G7 in the $n_{th}$ line of image data Raw_n and green pixel data G8 and G9 in the $(n+1)_{th}$ line of image data Raw_n+1. When the pixel detecting the green pixel data G6 is confirmed as a defective pixel in the second-stage defect evaluation (referring to FIG. 5B), as shown in FIG. 5C, the reference pixel information ((Gq+Gr)/2) corresponding to the green pixel data G6 is obtained from the vector D_R at index k and is used in a compensation calculation with the green pixel data G5, G7, G8 and G9 obtained from the buffered data Lines_n+2 and the green pixel data G10, G11 and G12 in the $(n+2)_{th}$ line of image data Raw_n+2 to generate a compensated pixel data C_Pixel to replace the green pixel data G6.

In the exemplary embodiment described in accordance with FIGS. 5A, 5B and 5C, the size of the vector D_R collecting the reference pixel information is small and thereby the total circuit size is reduced.

In some exemplary embodiments, the reference pixel information collected in the vector D_R does not include those for the red and blue pixels R and B. Only the reference pixel information for green pixels G is stored in the vector D_R.

Furthermore, in some exemplary embodiments, the number of line buffers is not limited to two for a 5×5 defective pixel detection and compensation pattern. The number of line buffers may be p for a (2 p+1)×(2 p+1) pattern for defective pixel detection and compensation.

Furthermore, in some exemplary embodiments, the detected image data is in other image format rather than the RGB format. For example, the aforementioned techniques also work on a YUV image format.

Any technique using the aforementioned concept in an image sensor for defective pixel detection and correction is within the scope of the invention. Based on the aforementioned technical contents, the invention further involves defective pixel detection and correction methods, which are not limited to any specific hardware architecture. In an exemplary embodiment, the aforementioned technical contents are realized by a microcontroller that performs calculations.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture device, comprising:
 a plurality of line buffers; and
 a logic circuit, determining defective candidates in an $n_{th}$ line of image data provided from an image sensor array based on the $n_{th}$ line of image data and buffered data in the plurality of line buffers, wherein when the $(n+p)_{th}$ line of image data is provided from the image sensor array the logic circuit further reexamines the defective candidates in the $n_{th}$ line of image data, for defective-pixel compensation, based on the $(n+p)_{th}$ line of image data and the buffered data in the plurality of line buffers,
 wherein:
 n and p are numbers;
 the buffered data in the plurality of line buffers contains the $(n-p)_{th}$ to $(n-1)_{th}$ lines of image data while the $n_{th}$ line of image data is provided from the image sensor array; and
 the buffered data in the plurality of line buffers contains the $n_{th}$ to $(n+p-1)_{th}$ lines of image data while the $(n+p)_{th}$ line of image data is provided from the image sensor array.

2. The image capture device as claimed in claim 1, wherein:
 the logic circuit further sets a dark/bright spot mark for each defective candidate in the $n_{th}$ line of image data for reexamination of the corresponding defective candidate in the $n_{th}$ line of image data.

3. The image capture device as claimed in claim 2, wherein:
 for each defective candidate in the $n_{th}$ line of image data, the logic circuit records a pixel location and the dark/bright spot mark into logic cells external to the plurality of line buffers.

4. The image capture device as claimed in claim 2, wherein:
 in the plurality of line buffers, each dark/bright spot mark is stored with pixel data corresponding thereto.

5. The image capture device as claimed in claim 1, wherein:
 the logic circuit performs the defective-pixel compensation on the $n_{th}$ line of image data based on the $n_{th}$ to the $(n+p-1)_{th}$ lines of image data buffered in the plurality of line buffers and the $(n+p)_{th}$ line of image data provided from the image sensor array.

6. The image capture device as claimed in claim 1, wherein:
 the logic circuit further looks up the $(n-p)_{th}$ to the $(n-1)_{th}$ lines of image data buffered in the plurality of line buffers to obtain reference pixel information about each defective candidate in the $n_{th}$ line of image data and records the reference pixel information into logic cells external to the plurality of line buffers.

7. The image capture device as claimed in claim 6, wherein:
 the logic circuit performs the defective-pixel compensation on the $n_{th}$ line of image data based on the reference pixel information recorded in the logic cells, the $n_{th}$ to the $(n+p-1)_{th}$ lines of image data buffered in the plurality of line buffers, and the $(n+p)_{th}$ line of image data provided from the image sensor array.

8. The image capture device as claimed in claim 6, wherein:
 p is 2;
 the logic circuit looks up the buffered data in the plurality of line buffers to obtain number 0 and 2 green pixel data from the $(n-2)_{th}$ line of image data and number 3 and 4 green pixel data from the $(n-1)_{th}$ line of image data, and calculates a first value from the number 0 and 3 green pixel data and a second value from the number 2 and 4 green pixel data by extrapolation, and regards an average of the first and second values as the reference pixel information about number 6 green pixel data contained in the $n_{th}$ line of image data, and stores the reference pixel information about the number 6 green pixel data into the logic cells external to the plurality of line buffers;
 pixels detecting the number 0 and 3 green pixel data are arranged in an upper left side of a pixel detecting the number 6 green pixel data; and
 pixels detecting the number 2 and 4 green pixel data are arranged in an upper right side of the pixel detecting the number 6 green pixel data.

9. The image capture device as claimed in claim 1, further comprising:
 the image sensor array,
 wherein the image sensor array, the plurality of line buffers and the logic circuit are packaged in a single package.

10. A method for defective pixel detection and correction of an image sensor array, comprising:
 based on an $n_{th}$ line of image data provided from the image sensor array and buffered data in a plurality of line buffers, determining defective candidates in the $n_{th}$ line of image data; and
 when the $(n+p)_{th}$ line of image data is provided from the image sensor array, reexamining the defective candidates in the $n_{th}$ line of image data, for defective-pixel compensation, based on the $(n+p)_{th}$ line of image data and the buffered data in the plurality of line buffers,
 wherein:
 n and p are numbers;
 the buffered data in the plurality of line buffers contains the $(n-p)_{th}$ to $(n-1)_{th}$ lines of image data while the $n_{th}$ line of image data is provided from the image sensor array; and
 the buffered data in the plurality of line buffers contains the $n_{th}$ to $(n+p-1)_{th}$ lines of image data while the $(n+p)_{th}$ line of image data is provided from the image sensor array.

11. The method as claimed in claim 10, further comprising:
 setting a dark/bright spot mark for each defective candidate in the $n_{th}$ line of image data for reexamination of the corresponding defective candidate in the $n_{th}$ line of image data.

12. The method as claimed in claim 11, further comprising:
 using logic cells external to the plurality of line buffers to record a pixel location and the dark/bright spot mark for each defective candidate in the $n_{th}$ line of image data.

13. The method as claimed in claim 11, wherein:
 in the plurality of line buffers, each dark/bright spot mark is stored with pixel data corresponding thereto.

14. The method as claimed in claim 10, further comprising:
 performing the defective-pixel compensation on the $n_{th}$ line of image data based on the $n_{th}$ to the $(n+p-1)_{th}$ lines of image data buffered in the plurality of line buffers and the $(n+p)_{th}$ line of image data provided from the image sensor array.

15. The method as claimed in claim 10, further comprising:

looking up the $(n-p)_{th}$ to the $(n-1)_{th}$ lines of image data buffered in the plurality of line buffers to obtain reference pixel information about each defective candidate in the $n_{th}$ line of image data; and using logic cells external to the plurality of line buffers to record the reference pixel information.

16. The method as claimed in claim 15, further comprising:

performing the defective-pixel compensation on the $n_{th}$ line of image data based on the reference pixel information recorded in the logic cells, the $n_{th}$ to the $(n+p-1)_{th}$ lines of image data buffered in the plurality of line buffers, and the $(n+p)_{th}$ line of image data provided from the image sensor array.

17. The method as claimed in claim 15, further comprising:

setting p to 2; and looking up the buffered data in the plurality of line buffers to obtain number 0 and 2 green pixel data from the $(n-2)_{th}$ line of image data and number 3 and 4 green pixel data from the $(n-1)_{th}$ line of image data, and calculating a first value from the number 0 and 3 green pixel data and a second value from the number 2 and 4 green pixel data by extrapolation, and regarding an average of the first and second values as the reference pixel information about number 6 green pixel data contained in the $n_{th}$ line of image data, and storing the reference pixel information about the number 6 green pixel data into the logic cells external to the plurality of line buffer, wherein:

pixels detecting the number 0 and 3 green pixel data are arranged in an upper left side of a pixel detecting the number 6 green pixel data; and pixels detecting the number 2 and 4 green pixel data are arranged in an upper right side of the pixel detecting the number 6 green pixel data.

* * * * *